United States Patent [19]

Goldstone

[11] Patent Number: 4,606,676

[45] Date of Patent: Aug. 19, 1986

[54] MANUFACTURE OF ARTICLES

[76] Inventor: Frederick A. Goldstone, 400 Burnley Street, Burnley, Victoria 3121, Australia

[21] Appl. No.: 525,474

[22] Filed: Aug. 22, 1983

[51] Int. Cl.$^4$ .......................... F16L 1/04; E02D 29/06
[52] U.S. Cl. .................................. 405/303; 405/136; 405/156; 405/166; 405/222
[58] Field of Search ............... 405/155, 156, 158, 166, 405/195, 222, 223, 303, 136; 264/31

[56] References Cited

U.S. PATENT DOCUMENTS

| | | | |
|---|---|---|---|
| 3,097,493 | 7/1963 | Blankevoort | 405/155 X |
| 3,249,664 | 5/1966 | Georgii | 405/223 X |
| 4,054,034 | 10/1977 | Hyre et al. | 405/223 |
| 4,345,854 | 8/1982 | Valantin | 405/155 X |

Primary Examiner—David H. Corbin
Attorney, Agent, or Firm—Larson and Taylor

[57] ABSTRACT

A method of manufacturing articles in which the articles are partially fabricated in a work area which is in portion of a buoyant platform and at least partially below the level of water within which the platform is located, the partially fabricated article being moved rearwardly through a seal or gland into the water, the seal or gland preventing water ingress to the work area. The article is supported by the rearward portion of the platform which fabrication can continue in the work area.

12 Claims, 5 Drawing Figures

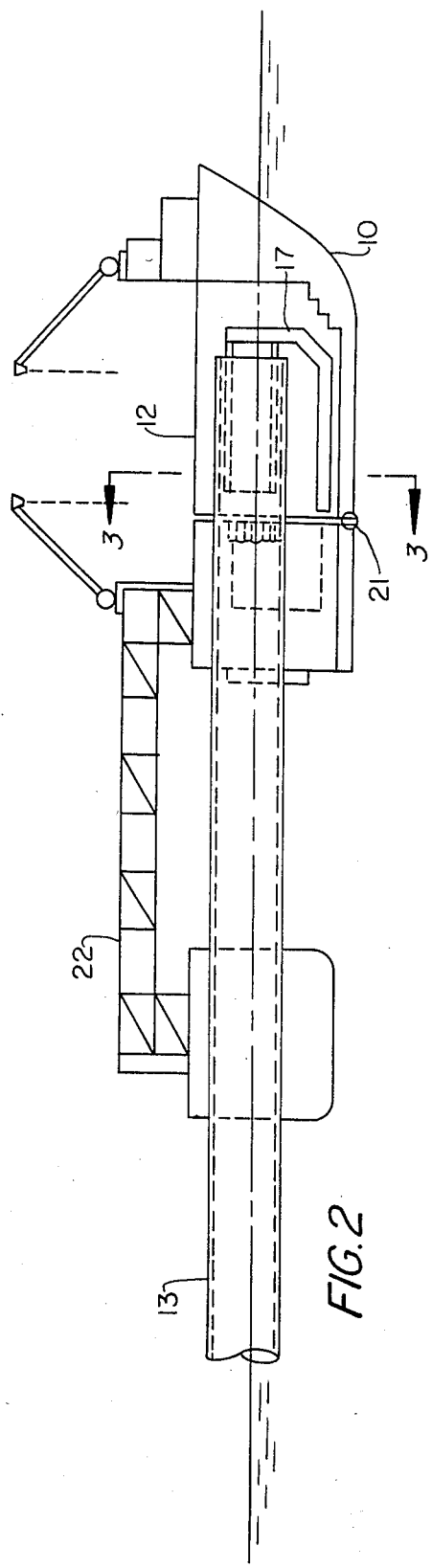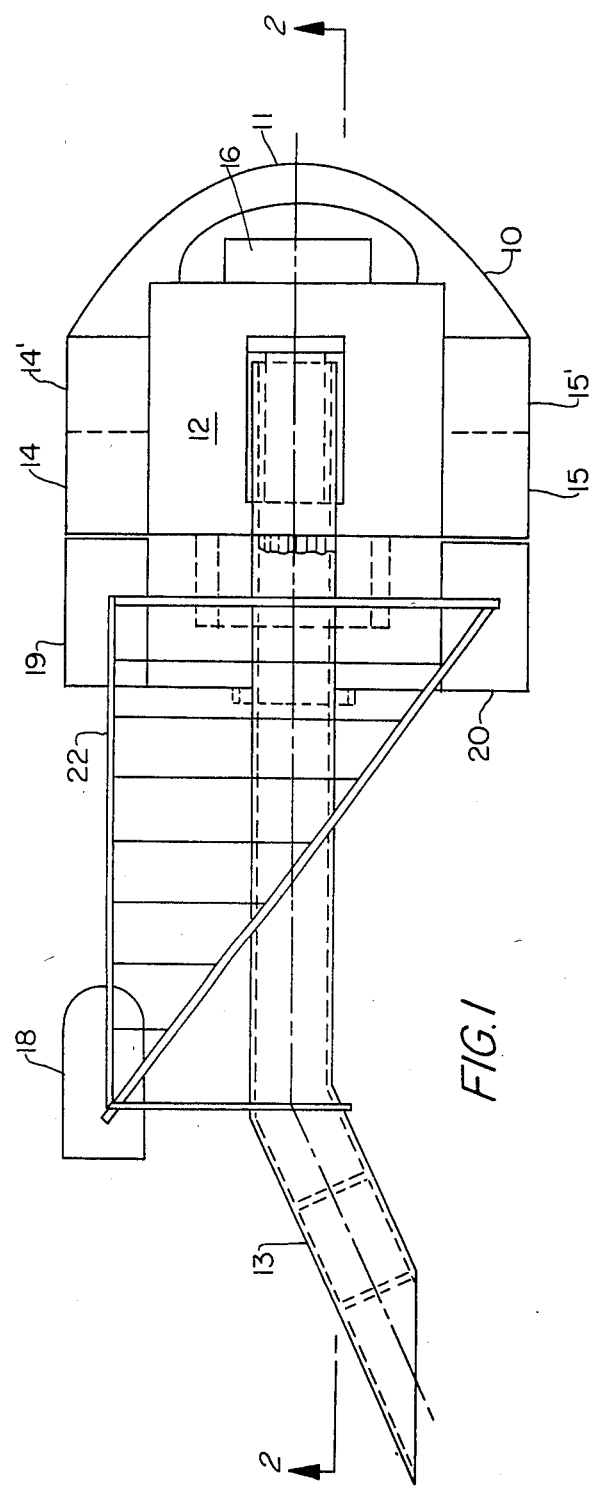

MANUFACTURE OF ARTICLES

This invention relates to improvements in the construction and manufacture of articles such as pipes, tunnels, flumes, floating structures such as ships, bridges, components for structures such as piers for bridges, bridge beams, wharves, off-shore structures, dams, salvage flotation barges, nuclear shelters and other structures and to machines for the manufacture thereof.

More specifically, the invention relates to articles of the type described hereinabove, hereinafter called the articles, which can be manufactured in natural water, such as rivers or seas, or in artificial ponds or dams and can particularly relate to articles which are intended to be located on or under an area of water such as a river or the sea.

The invention is particularly suitable for the manufacture of tunnels which are adapted to carry vehicular traffic on or in the sea bed, but also has applications such as for the fabrication and location of pipes for the transmission of liquids, gasses and/or solids.

The object of the invention is to provide a method of manufacturing articles whereby they do not have to be fabricated or connected beneath water level, in which joints, if needed, can be readily formed and which, if required, can be floated into a final position under controlled buoyancy.

The invention includes a method of manufacturing articles as hereinbefore described, comprising the steps of partially fabricating the article in a work area constituting the forward portion of a buoyant platform, which work area is at least partially below the level of water within which the buoyant platform is located, moving the partially fabricated article rearwardly through a seal, gland or the like which prevents water ingress to the work area and supporting the article by a rearward portion of the platform while fabrication of the article is continued in the forward portion.

The platform may constitute part of the hull of a ship or, alternatively, can be a moveable buoyant structure or it can be connected to pylons or the like and have means whereby it can be raised or lowered relative to the pylons.

Preferably the article, of it is enclosed, is provided with baffles at various distances along its length so that its buoyancy can be controlled.

If the top is open, baffles can be placed in the bottom of the article.

The invention also includes apparatus for fabricating articles which is a buoyant platform having a forward portion which constitutes a work area in which the article can be manufactured, which work area is at least partially below the level of water within which the buoyant platform is located, a seal, gland or the like at the rearward part of the forward portion and through which the article, when fabricated, can pass, which seal, gland or the like forms a water seal with the article, and a rearward portion of the platform adapted to support the article after it has passed from the forward portion.

In order that the invention may be more readily understood and put into practice, I shall describe two embodiments of the invention in relation to the accompanying drawings, in which:

FIG. 1 is a plan view of a floating vessel or dock incorporating the invention which vessel may, if required, be ocean going;

FIG. 2 is a section along line 2—2 of FIG. 1 showing a part completed article extending therefrom;

Figure 5:
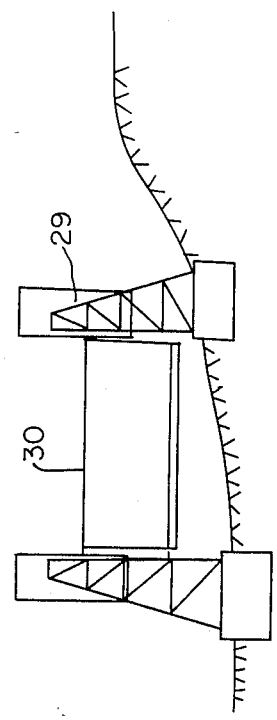
FIG. 5 is a schematic side elevation of a modification of the platform of FIG. 4.
Figure 3:
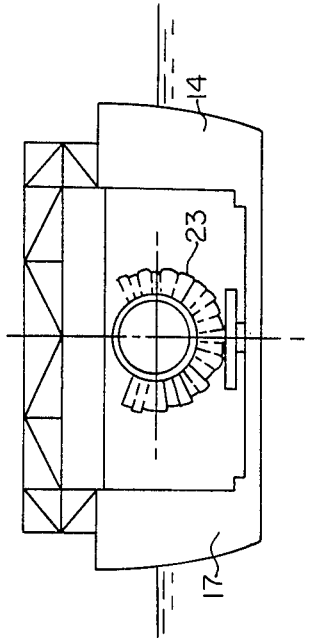
FIG. 3 is a section along line 3—3 of FIG. 2 showing the seal arrangement.

The vessel which is used in effecting the invention comprises two parts. The forward part 10 has a bow 11 and an open central area 12 which is the work area in which the article 13 is to be made, and for the purposes of this embodiment the article will be considered to be a tunnel. The bow 11 is so shaped to permit the vessel to be towed satisfactorily although, should it be required, the vessel could be self-powered.

On each side of the central area I provide a series of buoyancy tanks 14, 14', 15, 15' which can enable the level and pitch of the vessel relative to the surrounding water to be varied depending on the position required for the tunnel. One of more bow buoyancy tanks 16 may also be provided.

The central portion 12 of this forward part may contain the necessary form-work 17 to enable the tunnel to be fabricated and this form-work will, of course, depend upon whether or not the tunnel is to be fabricated from steel or reinforced concrete. The form-work can be considered to be completely conventional and will not be further discussed.

Adjacent this central portion normal support services may be provided and these may include, for example, a concrete mixing plant, a power generator for welding, cranes and gantrys and material stores.

The central portion may, if required, be roofed to enable working under any weather conditions.

The rearward part of the vessel may comprise three buoyancy areas 18, 19, 20 located in a triangle with two of these 19, 20 being directly behind the front part adjacent either side thereof and being interconnected and also pivotally connected at 21 to the front part and the third may be located behind one of the other two. The three tanks 18, 19 20 are interconnected by a rigid platform 22 which may preferably be in the form of a truss girder or some other similar load bearing structure which may or may not be covered. The platform 22 is solely to support the tunnel as it leaves the forward portion 10 and to ensure alignment with the forward portion so that the seal 23 through which the tunnel 13 passes is not deformed to permit ingress of water between the seal and the tunnel and into the central portion 12 of the forward part 10. The seal 23 may be of a conventional form and may comprise multiple layers of flexible flaps.

In use, the vessel will be considered when forming a tunnel or tunnel components and the first tunnel section can be fabricated in the central portion of the forward part with the rear of this part closed by a temporary bulkhead connected to the rear of the periphery of the seals. Alternatively, it can be fabricated independently and lifted into position.

The fabricated tunnel is moved rearwardly through the seal and is supported by the rear platform. Further fabrication can then proceed.

Depending on the type of form-work and the straightness, the tunnel can, if required, be rotated to enable relatively simple pouring of concrete or welding. It may well be that the welding is, in fact, effected from the inside of the tunnel rather than outside and the outside may, at the same time, be sheathed with a resistant material. Extra moulding on the outside of a non-circular cross section of tunnel can be used to form a more simple periphery.

As the tunnel section is fabricated, its outer end passes beyond the rear of the second part of the vessel but, because it is sealed, it has buoyancy and needs support only to ensure it retains alingment with the seal. It may, in practice, be desirable to insert various temporary baffles along the length of the tunnel and access to these can be provided so that more or less water can be introduced to maintain the required overall buoyancy of the tunnel.

When the tunnel section is finished, its inner end can be sealed and this end can pass through the seals at the rear of the front part of the vessel and the tunnel section is then supported by the rear part.

After the final end of the tunnel has been fabricated a temporary bulkhead for finishing is located forward of the seal and around this finished end of the tunnel to prevent the ingress of water into the construction dock when the finished end of the tunnel passes through the seal. This bulkhead for finishing can be removed when the external bulkhead for starting is replaced.

The tunnel can then be manouvered to its required position and, by varying the buoyancy of the tunnel, as by the introduction of water into some or all of the baffle compartments, the tunnel can be lowered into its required place. This may be on the floor of the area in the vicinity of which the tunnel was fabricated or may be in a trench dug for the tunnel in the floor. Alternatively, the whole tunnel section can be towed to a position remote from that at which it was fabricated and located by varying the buoyancy.

Because the front and rear parts of the vessel are pivotally connected, it is quite feasible to maintain the tunnel in the required straightness or in a limited vertical curve. Also by sliding and/or pivoting the table on the floor of the platform, the straightness in the other direction or curve in the other direction can be maintained.

It will be appreciated that because of the general arrangement it is relatively simple, by altering the formwork and the shape of the seal 23, to form a tunnel or other construction having widely varying aspects. It will, of course, be appreciated that if an article other than a cylindrical article is to be manufactured it would not be possible to so rotate it to accept the very simple welding or concrete pouring but, nevertheless, the basic convenience, that is being able to work satisfactorily under what are effectively ideal conditions, is maintained.

Figure 4:
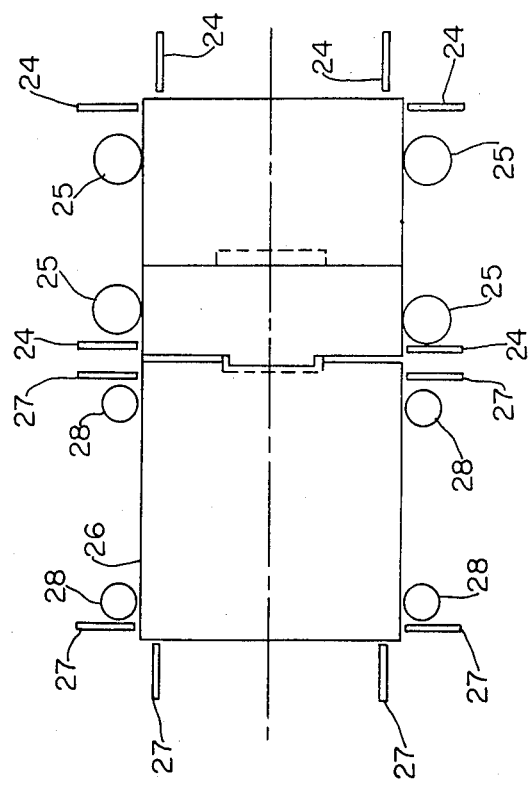
FIG. 4 is a schematic plan view of a fixed buoyant platform.

The embodiment schematically illustrated in FIG. 4 can be considered, practically, to be very similar to the earlier embodiment but is a stationary vessel or dock rather than a moveable vessel.

In this case the dock 30 which can be considered identical to the forward portion 10 of the previous embodiment, does not have to be shaped with a bow and is, in fact, retained against movement both laterally and transversely by guides 24. These guides may be of any required form and are imbedded in the bed of water area and are either in contact with or closely adjacent the dock. In order that the level of the dock can be controlled I provide buoyancy tanks 25, as shown. Such tanks are connected to the dock 30 and by admission and removal of water can locate the dock at the required height in the water and can also be manipulated to provide the required attitude to the dock.

In this case, instead of illustrating the portion 26 which is equivalent to the rear portion 22 of the previous embodiment as being triangular, I have shown it as being square or rectangular, again provided with guides 27 and buoyancy tanks 28. This portion 26 can be pivotally connected to the dock 30 or may be integral therewith as the effect of pivoting and adjustment can be obtained by control of the buoyancy tanks. The arrangement of the dock 30, as far as operation is concerned, can be considered identical to that of the forward portion 10 of the previous embodiment and this arrangement has not been illustrated. This form of dock can, of course, be located adjacent an access landing, if it is being used close to the edge of the particular body of water, and the required materials can be readily delivered thereto in a conventional manner.

The embodiment in FIG. 5 can, to a large extent, be considered similar to that of FIG. 4 except that instead of having guides 24 and buoyancy tanks 25, I provide pylons 29 which may act both to guide the dock 30 and to locate it relative to the water surface.

In this embodiment the pylons may each be provided with a rack and pinion or hydraulic motors whereby the dock 30 can be raised or lowered as required.

Alternatively, lever arms could be provided to permit the control of the location of the dock 30.

It is to be stressed that the effective operation of the later embodiment described is the same as that of the first embodiment and the tunnel, or other article, is manufactured in a manner identical to that as described in respect of the first embodiment.

Provision for bends or curves along the article is desirable where, for example, the tunnel is designed to lie beneath a shipping lane and to then extend upwardly at each end to a position which is finally above water level. When forming a tunnel is this shape the bends would either be formed downward, that is in the direction opposite to that finally required, or in a sideways manner. Shaping in a sideways manner would apply easily if all the bends are in one plane.

Where there are buoyancy tanks in both parts of the vessel, account can be taken of tide movement and/or weather conditions. For example, if high seas should run the vessel or dock and the tunnel can be provided with lessened buoyancy so that the effect of the seas is reduced and, when construction is to recommence, by increasing the buoyancy required working condition can be attained.

In this specification the terms rearward and forward are basically used for convenience and are not considered restricting.

I claim:

1. A method of manufacturing articles in a body of water comprising the steps of
    partially fabricating the article in a horizontal work area constituting a forward portion of a buoyant platform, which horizontal work area is at least partially below the level of water within which the buoyant platform is located,
    moving the partially fabricated article horizontally and rearwardly through a seal, gland or the like which prevents water ingress to the work area, and
    supporting the article by a rearward portion of the platform while fabrication of the article is continued in the forward portion.

2. A method as claimed in claim 1 wherein the portion of the article which has passed horizontally and rearwardly through the seal is positioned horizontally beneath at least a part of the rearward portion and is supported therewith.

3. A method as claimed in claim 1 wherein a horizontal pivotal connection is provided between the forward and rearward portions to enable control of the alignment of the article.

4. A method as claimed in claim 1 wherein the forward and rearward portions have variable buoyancy means so the horizontal position of the article relative to the water level can be controlled.

5. A method as claimed in claim 1 wherein the article is provided with temporary baffles whereby the buoyancy of the article can be controlled.

6. For the manufacture of articles in a body of water,
a buoyant platform having a forward portion which constitutes a horizontal work area in which the article can be manufactured in a horizontal direction, which work area is at least partially below the level of water within which the buoyant platform is located,
a seal, gland or the like at a rearward part of the forward portion and through which the article, when fabricated, can horizontally pass, which seal, gland or the like forms a water seal with the article, and
a rearward portion of the platform adapted to support the article after it has passed horizontally from the forward portion.

7. A platform as claimed in claim 6 wherein part at least of the rearward portion lies over the article and supports the horizontal article vertically.

8. A platform as claimed in claim 7 wherein the two portions are pivotally connected about a horizontal axis.

9. A platform as claimed in claim 6 wherein the platform is a vessel adapted to be towed or self propelled to a site at which an article can be produced.

10. A platform as claimed in claim 6 wherein the platform is moored and held against horizontal movement.

11. A platform as claimed in claim 10 wherein the platform is provided with buoyancy tanks whereby the vertical position of the horizontal delivery of the article can be controlled.

12. A platform as claimed in claim 10 wherein the platform is held by pylons and means are provided to vary the relative vertical position of the platform along the pylons.

* * * * *